United States Patent [19]
Bayhi

[11] 4,396,088
[45] Aug. 2, 1983

[54] FLEXIBLE MARINE SEISMIC SOURCE

[75] Inventor: Joseph F. Bayhi, Houston, Tex.

[73] Assignee: Exxon Production Research Co., Houston, Tex.

[21] Appl. No.: 232,095

[22] Filed: Feb. 6, 1981

[51] Int. Cl.³ .................... G01V 1/14; G01V 1/38
[52] U.S. Cl. .................... 181/120; 181/106; 181/110; 367/143; 367/912
[58] Field of Search ............ 367/23, 143, 189, 912; 181/106, 110, 111, 120, 142; 175/1; 124/73; 73/665

[56] References Cited

U.S. PATENT DOCUMENTS

| | | | |
|---|---|---|---|
| 2,424,108 | 7/1947 | Merten | 181/106 |
| 3,331,050 | 7/1967 | Kilmer et al. | 367/23 |
| 3,376,949 | 4/1968 | Baker et al. | 181/120 |
| 3,384,868 | 5/1968 | Brown et al. | 367/143 |
| 3,479,638 | 11/1969 | Rusnak | 367/23 |
| 3,482,646 | 12/1969 | Brown et al. | 181/120 |
| 3,676,840 | 7/1972 | Bays | 367/143 |
| 3,718,205 | 2/1973 | Fair et al. | 181/106 |
| 4,042,063 | 8/1977 | Waters | 181/106 |
| 4,153,134 | 5/1979 | Yang | 181/120 |
| 4,211,301 | 7/1980 | Mifsud | 367/143 |
| 4,252,210 | 2/1981 | Sadich | 367/142 |

FOREIGN PATENT DOCUMENTS

| | | | |
|---|---|---|---|
| 656232 | 1/1963 | Canada | 367/143 |
| 2300346 | 10/1976 | France | 181/120 |

OTHER PUBLICATIONS

Broding et al., "A High Power . . . Vibroseis System", 4/71, pp. 90-95, IEEE Trans. on Geos. Elect., vol. GE-9, #2.

*Primary Examiner*—Nelson Moskowitz
*Attorney, Agent, or Firm*—E. T. Wheelock

[57] ABSTRACT

The invention relates to a marine seismic source which emits an FM signal linearly increasing from 10 Hz to about 100 Hz. The source has a number of transducers which are flexible sleeves containing a pulsing hydraulic fluid.

14 Claims, 7 Drawing Figures

FLEXIBLE MARINE SEISMIC SOURCE

BACKGROUND OF THE INVENTION

1. Object of the Invention

This invention relates to an improved seismic energy source which generates low-frequency signals used in searching for petroleum under a waterbody. In particular, it relates to a seismic source having a number of closed flexible sleeves which transmit a varying frequency modulated signal into the water. A relatively low pressure hydraulic source keeps the sleeves inflated and oscillates the sleeve's compliant walls at the desired frequency.

2. Field of the Invention

The ever more difficult search for petroleum has led to exploration in areas which were through by many just a short time ago to be incapable of producing petroleum at an economically feasible price. The rising price of petroleum coupled with its relative domestic scarcity has made acceptable the costs associated with production in such forbidding regions as Alaska and the North Sea, as well as in a number of North American offshore areas.

Of the many methods used in the prospecting for subsea petroleum, few have attained as widespread an acceptance as has the use of towable marine seismic sources.

The theory of operation in using acoustic sources to search for petroleum is quite simple. An acoustic signal is introduced into the water body from an acoustic source towed behind a ship. The acoustic wave propagates down through the water, across the water-floor interface, and into the subfloor geologic formations. The resultant echoes are, so some extent, reflected back across the same path to an array of geophones waiting near the water's surface. Analysis of the signals produced by the geophones can provide some instruction concerning the structure of the subfloor geological formations and attendant petroleum accumulation within those formations.

The term "water" as used herein is meant to include swampwater, mud, marshwater, seawater or any other liquid containing sufficient water to enable operation of the invention.

There are a number of different methods for producing an acoustic pulse. For instance, the earliest attempts entailed the use of solid explosives. This method produces a strong acoustic wave which, accordingly, achieves substantial penetration into subfloor geologic formations and a strong return echo. Solid explosives possess certain obvious drawbacks: they are dangerous to store, handle, and use. When set off in open water, they kill marine life. In a crowded area such as a harbor, they cannot be used at all. Solid explosives are orders of magnitude more expensive to use, on a per-shot basis, than are most other acoustic sources. Modification of the acoustic signature to achieve an acceptable spectrum distribution is most difficult.

Apparatus using explosive gas mixtures, e.g., propane and oxygen, to produce an acoustic signal in the form of a pulse or shock wave have gained wide acceptance. The two major types of explosive gas guns are: first, those which operate by exploding a combustible gas mixture behind a flexible membrane which is in turn in contact with the water; and, second, those which operate by allowing the abrupt bubble from the gas explosion to pass directly into the water. An example of the former apparatus can be found in U.S. Pat. No. 3,658,149; an example of the latter apparatus can be found in U.S. Pat. No. 4,193,472.

Devices using high pressure compressed gases to generate an acoustic pulse are also widely used by the industry. These apparatus, or guns, typically employ a gas-holding chamber which is first pressurized to a pre-set level and then is fired by allowing the pressurized gas to explosively exit the gun into the surrounding water. Examples of open-ported pressurized gas guns are found in U.S. Pat. No. 3,653,460, to Chelminski, and U.S. Pat. No. 4,141,431, to Baird.

The device of the present invention is a member of a class which generates a relatively low-power and low-frequency (10–100 Hz) acoustic signal which extends over a period of seconds. The transmitted signals are by design low-frequency to reduce attenuation losses in the reflected waves. The transducer in the disclosed device is an array of flexible sleeves in contact with the water and is driven by a modulated hydraulic actuator. Unlike the previously mentioned devices which emit but a single spike-like pulse and thereby provide a discreet echo at some readily determinable point in time, these devices often vary the frequency of the transmitted signal in some pre-set manner so that a unique instantaneous frequency in the reflected signal can be correlated with that frequency in the transmitted signal. The reason for varying a property such as frequency during a signal should be apparent. A spike-like pulse has but a single echo from a particular point below the ground. A single frequency signal that lasts several seconds would result in echoes carrying little or no useful information. It would be substantially impossible to determine whether the echo resulted from the beginning of the signal or its end. Consequently, the time for transit of the signal into the earth and return would be lost.

A signal used by the invention may have a duration of several seconds and linearly sweep the frequency range between two points, e.g. 10 Hz and 100 Hz, whereupon the signal ceases and restarts at 10 Hz. During each sweep, the instantaneous frequency of received signal can be correlated with high precision with that of the transmitted signal. Variations of the transmitted signal may be desirable. For instance, the swept signal need not be continuous throughout the sweep range. A non-continuous signal can solve a problem known as "ringing". This occurs when the distance between the water's surface and an acoustically hard bottom is some discreet multiple of an acoustic signal wavelength. A standing wave is created which, upon reception by the hydrophones, effectively overrides and obliterates any meaningful information carried in returning echoes having a different frequency. If the "ringing" frequency is, e.g., about 21 Hz, then an acoustic sweep ranging from 10 Hz to 100 Hz can be silenced between 17 Hz and 25 Hz. Other seismic sources which emanate "white noise", such as gas guns, cannot be so readily tuned and therefore may be completely ineffective in certain subsea areas.

It is not necessary that the signal be linearly increasing. It may be neither linear nor increasing just so long as the frequency of the echoed signal can be closely correlated as a function of time with the transmitted signal.

Another major problem associated with the low-power, low-frequency chirp seismic sources is one of efficiency. It is difficult to design a hydraulically powered seismic source in which a significant proportion of its input power appears in the output acoustic signal. Consequently, a number of hydraulically powered seismic sources use a fairly high internal hydraulic pressure to assure sufficient and usable signal strength in the returning echo.

The device disclosed herein is intended to provide high efficiency by maximizing the area of the flexible transducer exposed to the water. By doing so, the seismic source also allows the use of a relatively low pressure hydraulic system.

SUMMARY OF THE INVENTION

The invention, as mentioned above, uses a number of flexible sleeves as the transducer applying the acoustic wave to the water. The flexible sleeves can be made up of an elastomeric material such as rubber or neoprene and filled with a liquid which is pulsed at a desired varying frequency by a single on-ship marine vibrator or modulator. The hydraulic fluid filling the sleeves, desirably water, may be kept at a relatively low pressure. The portion of the seismic source system that is trailed in the water from a ship is significantly lighter than analogous known marine vibrators. The high surface area of the flexible sleeves provides effective coupling of the device to the water.

DESCRIPTION OF THE PREFERRED EMBODIMENTS

The device is elegant in its simplicity. A single on-ship apparatus is used to produce a varying low frequency acoustic signal in a hydraulic liquid. The hydraulic liquid is then directed to a large array of flexible transducers below sea level. The oscillating hydraulic liquid may flow through the transducers and back to the ship. The hydraulic liquid alternatively may be non-flowing and within a large closed system terminated by the transducers. In either event, each of the flexible, preferably sleeve-shaped, transducers ripples or pulses at the frequency of the on-board oscillator.

Figure 1A:
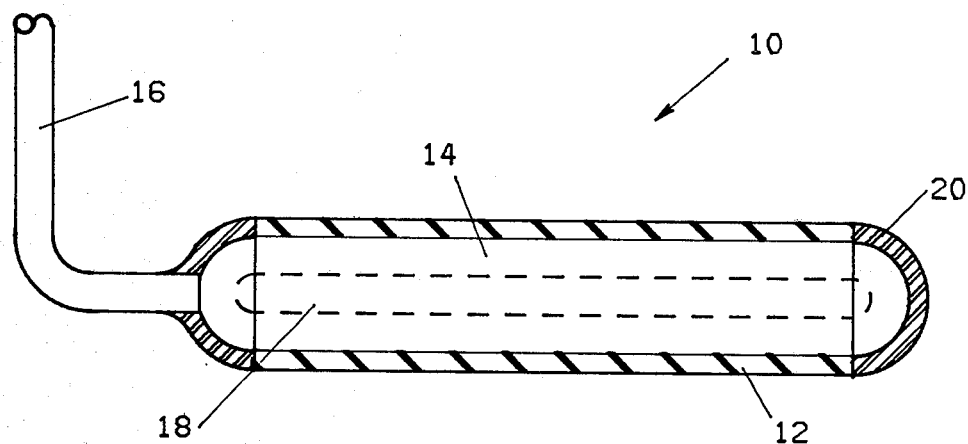
FIGS. 1A and 1B schematically depict two configurations of individual hollow sleeves used as transducers in the seismic source.

A central feature of this invention is the flexible sleeve transducer. FIG. 1A depicts the transducer 10 in its most basic form. The transducer has a flexible and expansile sleeve 12 which may be cylindrical in the form and is composed of an elastomeric material such as rubber or neoprene. The sleeve 12 encloses a chamber 14. The chamber 14 is in hydraulic communication via hydraulic line 16 with a hydraulic actuator (not shown here). Hydraulic line 16 should be of a fairly stiff construction. In this way most of the energy in the pulsing liquid is transmitted to the water through the flexible sleeve and little is lost flexing the feed lines. The chamber 14 may optionally contain a billet 18 which merely serves to occupy a central porion of the volume of chamber 14 and provide a layer of liquid against the flexible sleeve 12. The hydraulic fluid within chamber 14 is intended to keep the flexible sleeve 12 inflated against the hydrostatic pressure of the water surrounding the source during use and to transmit the desired frequency to the sleeve 12 and thence to the water.

The transducer 10 is closed by an end 20. The depicted end 20 is a stiff cap which serves to keep the sleeve 10 in a relatively cylindrical form. It may be, as illustrated, streamlined to allow the seismic source to move through the water with relative ease. The end 20 may also be integral with the sleeve 12 or may be as simple in construction as a plug.

The transducer in FIG. 1A is used as the termination of a static or closed system. There is no continuous flow through the transducer. There will obviously be some flow in and out of the chamber 14 as the flexible sleeve 12 ripples in response to the pulsed fluid in line 16.

Figure 1B:
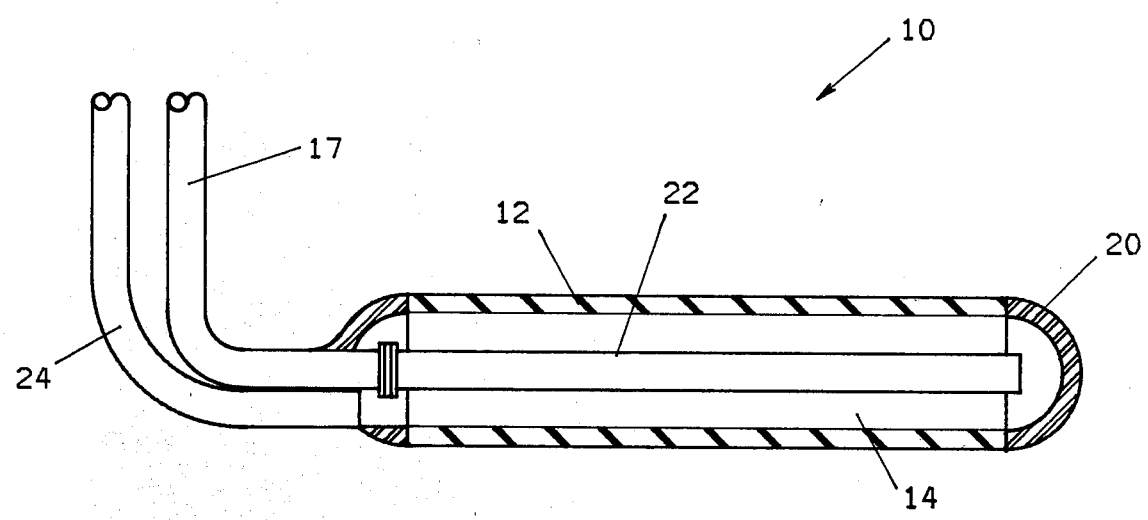

Conversely, the transducer depicted in FIG. 1B is used in a flowing system. The pulsed hydraulic fluid flows into hydraulic line 17. It enters the transducer at a first end and proceeds through feed pipe 22 to a second end 20. The feedpipe 22 is approximately concentric with sleeve 12. From there, it flows back into the chamber 14 wherein it pulses sleeve 12. The fluid then exits the seismic source through lines 24 either back to the hydraulic source (not shown) or elsewhere. The hydraulic fluid may be seawater and, if such is the case, returned to the sea. It may be recycled if desired. If the seawater is merely returned to the sea, then a device capable of maintaining backpressure in chamber 14 must be installed either in line 24 or at the point where the hydraulic fluid exits the transducer 10.

Figure 2:
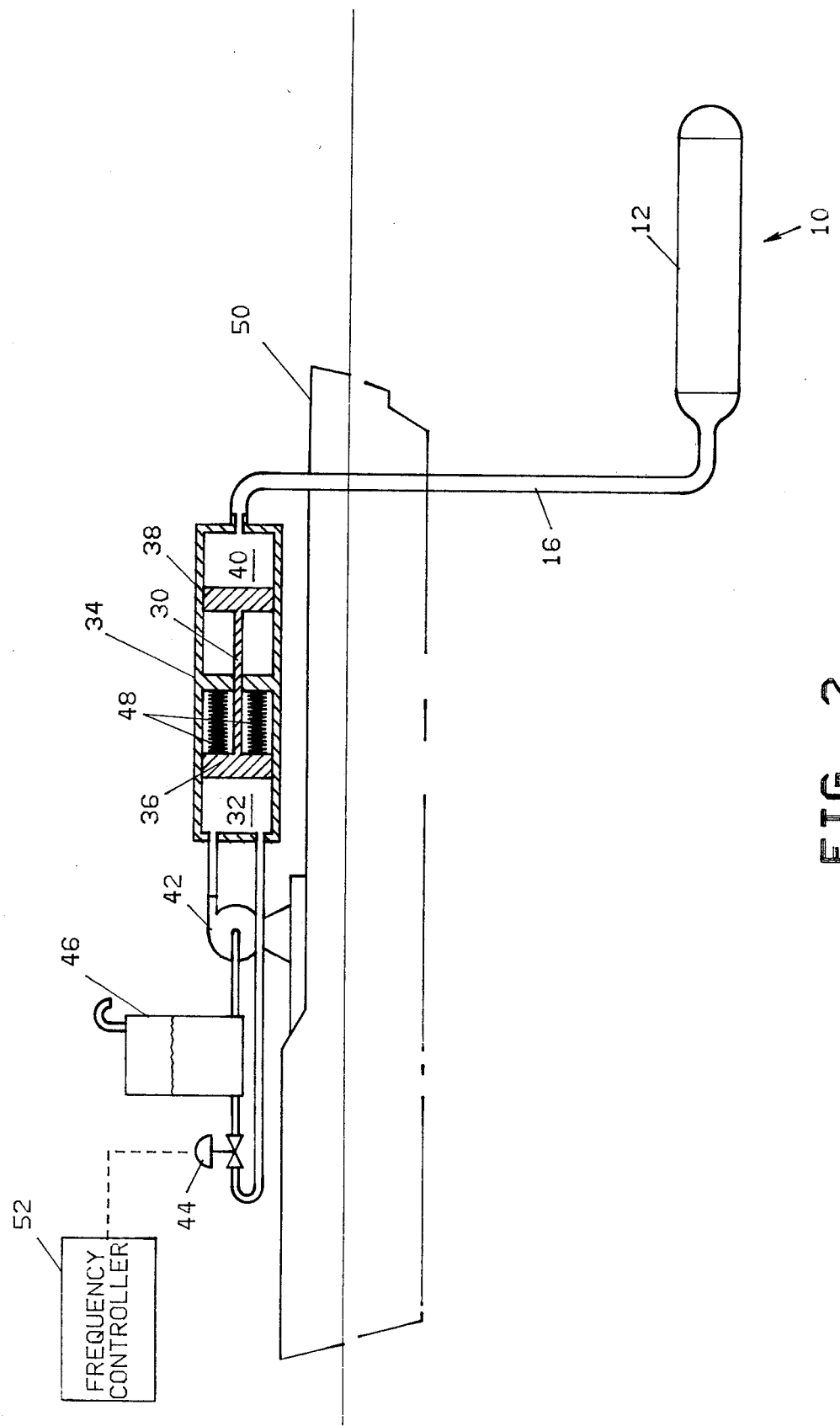
FIGS. 2-4 schematically depict various configurations of the inventive sleeve transducers and apparatus suitable for relaying an oscillating hydraulic liquid to the transducers.
Figure 3:
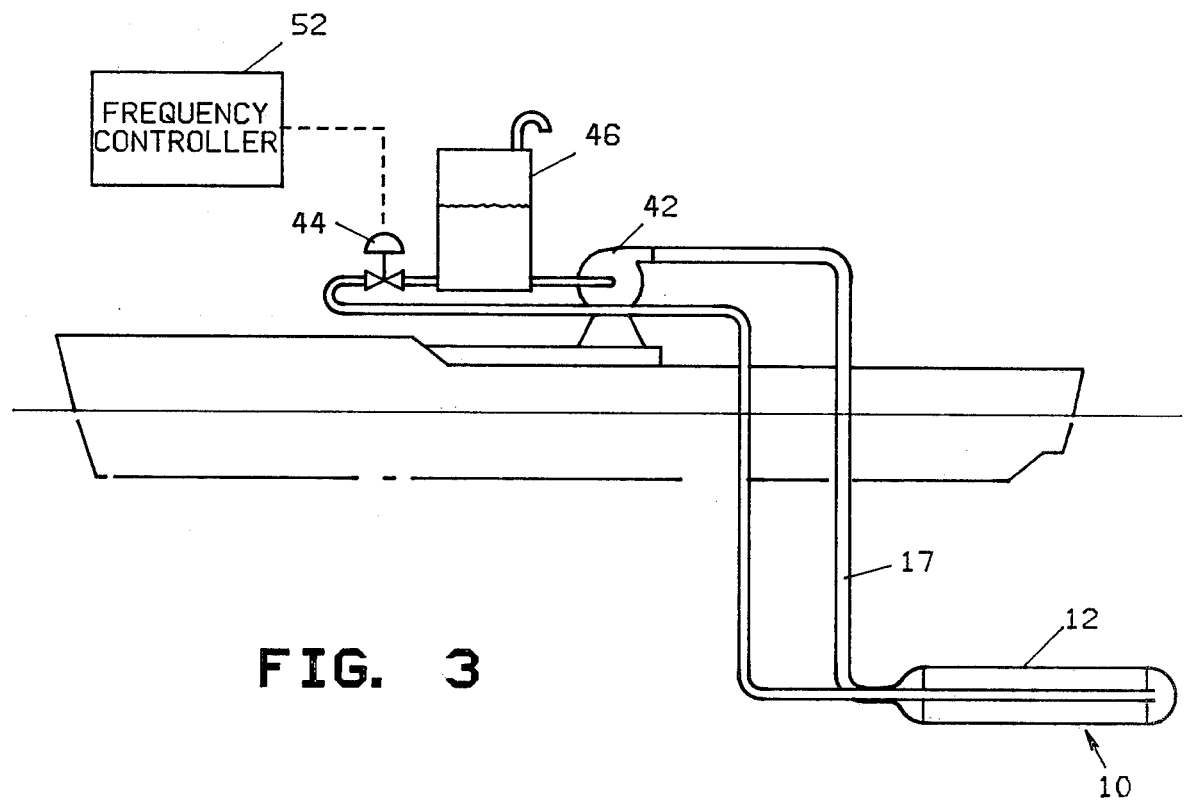
Figure 4:
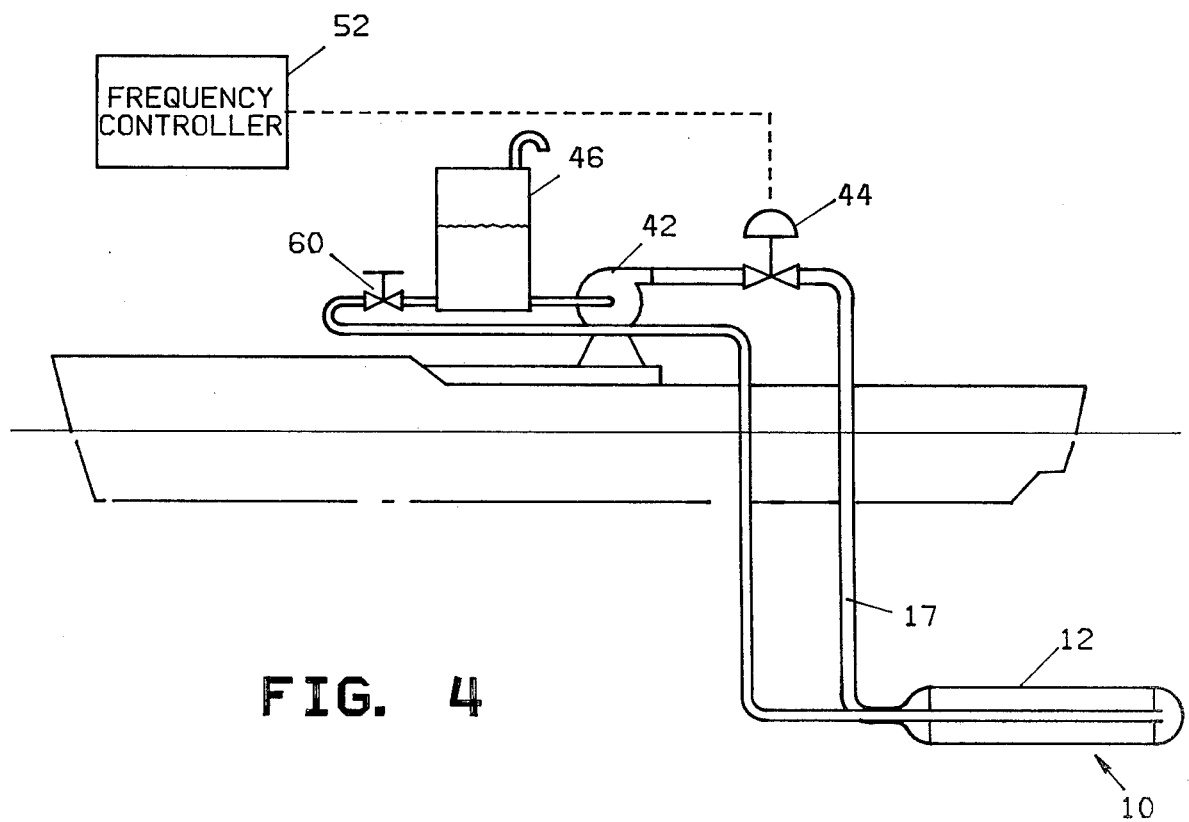

FIGS. 2, 3, and 4 show apparatus suitable for imposing a varying frequency upon the transducers found in FIGS. 1A and 1B.

FIG. 2 schematicizes a closed actuator system which is especially suited for the transducer in FIG. 1A. A single transducer 10 is depicted below the surface of the water although, as will be discussed later, a number of flexible transducers in an array normally will be deployed.

The apparatus in FIG. 2 operates by using a double-ended piston 30. The volume 32 in the primary end of the cylinder 34 is varied at a desired frequency. The varying volume presses on primary piston head 36 which in turn moves the secondary piston head 38. The sum of the liquid in secondary volume 40, stiff hydraulic line 16, and transducer 10 is a constant. When piston 30 moves at a particular frequency, the flexible sleeve 12 in transducer 10 expands and contracts at that frequency. The acoustic wave consequently is conveyed into the water.

The primary piston head 36 is oscillated in cylinder 34 by a pump 42 and a control valve 44. Pump 42 desirably takes suction on a tank 46 having a constant pressure. A standpipe in tank 46 may be desirable in assuring constancy of pump inlet pressure. In any event, the pump 42 passes a liquid into volume 32 where it presses against primary piston head 36. Primary piston head 35 pushes against spring 48. The pressure in volume 32, and hence the distance primary piston head 36 moves against spring 48, is determined by frequency control valve 44. Frequency control valve 44 is simply a valve which is oscillated in the flowing stream exiting volume 32 at a desired frequency. For instance, a frequency controller 52 might direct valve 44 to stroke at a rate of 10 times per second and linearly increase to a rate of 40 times per second over a 30-second interval. The frequency of the valve stroke will be seen in the movement of piston 30 and the subsea signal-producing pulse of flexible sleeve 12.

Although the frequency actuation system shown in FIG. 2 has the advantage of simplicity and light weight, in that only one hydraulic line 16 need be over the side of the survey vessel 50, care must be taken to eliminate gases from volume 40, hydraulic line 16, and transducer 10. Although the device will operate even though compressing gases therein, the movement of flexible sleeve 12 is diminished and, with it, the ability to efficiently transfer a signal to the water.

FIGS. 3 and 4 show a system for inducing a signal having a particular frequency into the inventive seismic source by using a flowing hydraulic fluid. These configurations are especially suitable for the seismic source shown in FIG. 1B. Both systems pulse the seismic source 10 by varying the pressure in the seismic source at the desired frequencies.

In FIG. 3, pump 42 sends liquid, preferably at a relatively constant pressure, to the seismic source 10 via stiff hydraulic line 17. The liquid is at sufficient pressure to expand the flexible sleeve 12. The liquid is released from the expanded sleeve 12 at a frequency corresponding to that desired of the seismic source by stroking control valve 44. Control valve 44 is operated by a frequency controller 52 similar to the one discussed with respect to FIG. 2. A surge tank 46 may be installed between frequency control valve 44 and the inlet to pump 42.

FIG. 4 shows alternate apparatus for applying a flowing pulsing liquid to the inventive seismic source. In this configuration, the discharge of pump 42 is stroke using a frequency control valve 44. Back pressure is maintained on seismic source 10 by valve 60. Again, the stem of valve 44 is oscillated at the required or desired frequency by a frequency controller 52. A surge tank 46 may be located between the back pressure valve 60 and the intake of pump 42. It may have a standpipe therein to maintain a relatively constant pump inlet pressure.

Figure 5:
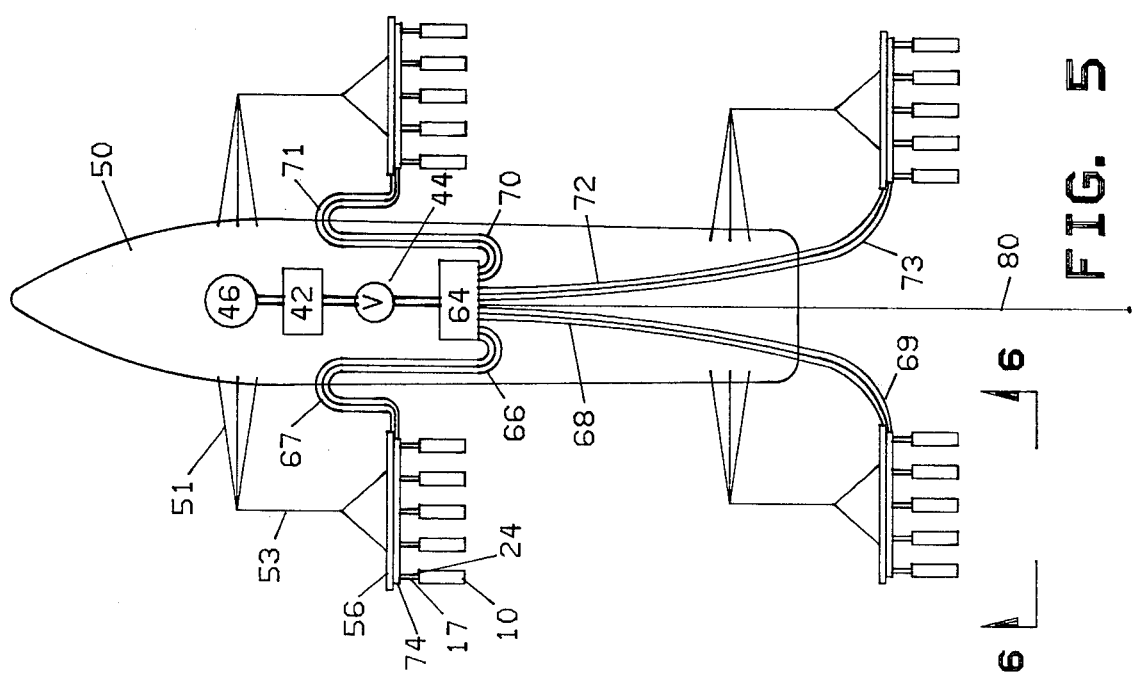
FIG. 5 is an elevation of a seismic ship deploying sleeve transducers built according to the invention.

FIG. 5 is a schematic representation showing deployment of the invention. Several arrays of transducers are towed by a seismic vessel 50. Vessel 50 has four davits 51, each for towing an array of transducers 10 by means of an appropriate tow line 53. Tow line 53 is connected to a yoke 56 to which the individual transducers 10 may be connected by wire lines between the yoke 56 and the transducers 10.

Figure 6:
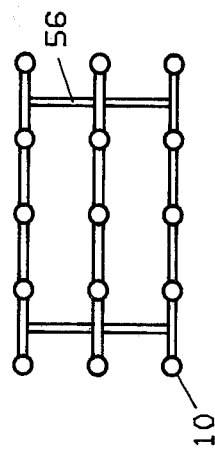
FIG. 6 is a view from the aft end of one array of the inventive sleeve transducers.

In the preferred embodiment, each array includes fifteen transducers. See FIG. 6. Thus, the vessel can tow up to sixty transducers at one time. This feature permits the use of relatively small, manageable transducers while the total surface area available to radiate energy into the water remains large.

Vessel 50 carries a pump 42, frequency control valve 44, a surge tank 46, and a manifold 64. The depicted on-ship system is similar in operation to the system in FIGS. 3 and 4. Pump 42 is connected by a suitable conduit to valve 44 which modulates the pressure of the hydraulic fluid, as will be explained more fully. Manifold 64 divides the flow from the valve 44, among four main conduits 66, 68, 70, 72, which preferably are large diameter, low resistance hoses. Each of these hoses connects manifold 64 to a second manifold 74 affixed by bolts or other suitable means to each yoke 56. Manifold 74 distributes the flow from its main conduit among fifteen smaller conduits 17 which lead from manifold 74 to the individual transducers 10. In this configuration, the hydraulic fluid flows back on shipboard through a return conduit 24 between transducer 10 and manifold 74. The return hydraulic fluid is collected in four main return conduits 67, 69, 71 and 73 which run into manifold 64. The fluid is then recycled back to surge drum 46.

Further, conduits 66, 68, 70, 72 and 16 are sized so that the plurality of conduit paths from pump 42 to the transducers 10 are of substantially of equal hydraulic length. Thus, sleeves 12 will expand and contract synchronously and produce the desired aggregate or combined seismic signal.

In operation, the arrays of transducers are deployed at the desired depth in the sea or lake, as shown in FIG. 5. The discharge pressure of pump 42 is set taking into account the depth of the transducers and other factors. The hydraulic fluid is preferably seawater (or lakewater, in the case of a lake), primarily because of its low cost and ready availability. As the vessel moves through the water, the frequency controller valve 44 is controlled to modulate the pressure of the hydraulic fluid in the transducers, causing sleeves 12 alternately to expand and contract or ripple and produce the desired seismic signals. Cable 80 trailing from the stern of the vessel, is attached to a number of hydrophones which pick up signals reflected from the earth underlying the body of water. These signals are processed and analyzed to give some indication of the subsea geologic structure.

The foregoing disclosure and description of the invention are illustrative and explanatory thereof, and various changes in the size, shape and materials, as well as in the details of the illustrated construction and operation may be made within the scope of the appended claims without departing from the spirit of the invention.

I claim:
1. A marine seismic source comprising:
a plurality of flexible elongated sleeve-shaped transducers adapted to generate acoustic seismic signals upon application of a pulsing fluid to the interior of the sleeve, each having a first end and a second end and containing a feed pipe which is inside and approximately concentric to said sleeve-shaped walls and extending from the first end to the vicinity of the second end wherein the lead pipe releases said pulsing fluid and is in communication at the first end to said source of pulsing fluid,
an outlet in said transducers' first end in communication with the space between the sleeve-shaped wall and the feed pipe allowing said pulsing liquid to leave said transducers,
a source of pulsing fluid,
a plurality of stiff-walled conduits connecting the plurality of transducers to the source of pulsing liquid and each adapted to be of equal hydraulic length between said source and said transducers,
whereby said flexible transducers can oscillate and produce a seismic signal.
2. The apparatus of claim 1 wherein the sleeve-shaped transducers have walls comprised of a member selected from the group of rubber and neoprene.
3. The apparatus of claim 1 additionally including a conduit connected to the outlet in the first end and adapted to recycle the pulsing liquid back to the source of pulsing liquid.
4. The apparatus of claim 1 additionally including means connected to the outlet in the first end adapted to maintain pressure on each of said transducers.

5. The apparatus of 1, 3 or 4 wherein the pulsing liquid is seawater.

6. The apparatus of claim 1 wherein the source of pulsing fluid is adapted to increase the frequency of pulsing linearly with time between about 10 Hz and about 10 Hz.

7. A marine seismic source comprising:

at least one transducer having flexible sleeve-shaped walls and adapted to generate acoustic marine signals upon application of a pulsing fluid to the interior of said transducer, and also having a first end and a second end and containing a feed pipe which is inside and approximately concentric to said flexible sleeve-shaped walls and which feed pipe extends from said first end to the vicinity of said second end and is in communication at the first end with a source of pulsing fluid and said at least one transducer having an outlet in the first end in communication with the space between said sleeve-shape walls and the feed pipe whereby pulsing fluid can exit said at least one transducer, and a source of pulsing fluid, means for modulating the pressure of the pulsing fluid at a frequency in the range of 10 Hz to 100 Hz, whereby said at least one transducer is capable of generating a marine seismic signal.

8. The apparatus of claim 7 wherein each of said at least one transducer includes a billet within the flexible walls which serves to lower the volume of the transducer, said walls enclosing but not contacting said billet.

9. The apparatus of claim 7 wherein the source comprises at least one array of said transducers each connected to said source of hydraulic fluid by conduits having substantially the same hydraulic length.

10. The apparatus of claim 9 wherein said source comprises four arrays of transducers in three rows of five each.

11. The apparatus of claim 7 additionally including a conduit connected to the outlet in the first end and adapted to recycle the pulsing liquid back to the source of pulsing liquid.

12. The apparatus of claim 7 additionally including means connected to the outlet in the first end adapted to maintain pressure on each of said transducers.

13. The apparatus of claim 7, 11 or 12 wherein the hydraulic fluid is seawater.

14. The apparatus of claim 7 wherein the source of pulsing fluid is adapted to increase the frequency of pulsing linearly with time between about 10 Hz and about 100 Hz.

* * * * *